United States Patent
Leavitt et al.

(10) Patent No.: US 8,498,935 B2
(45) Date of Patent: Jul. 30, 2013

(54) SYSTEM AND METHOD FOR AUTOMATED PAYMENT AND ADJUSTMENT PROCESSING

(76) Inventors: Stacy A. Leavitt, Grayslake, IL (US); Stephen Louis Malloy, San Francisco, CA (US); Robert Rogoff, Wilmette, IL (US); Alan J. Walters, Chicago, IL (US); Brian R. Schweigel, Antioch, IL (US); William M. Steiner, Park Ridge, IL (US); Xiang Kong, Lake Zurich, IL (US)

( * ) Notice: Subject to any disclaimer, the term of this patent is extended or adjusted under 35 U.S.C. 154(b) by 1023 days.

(21) Appl. No.: 11/544,353

(22) Filed: Oct. 4, 2006

(65) Prior Publication Data

US 2007/0038564 A1    Feb. 15, 2007

Related U.S. Application Data

(63) Continuation of application No. 10/865,076, filed on Jun. 10, 2004, now abandoned.

(60) Provisional application No. 60/508,221, filed on Oct. 2, 2003.

(51) Int. Cl.
*G06Q 40/00* (2012.01)

(52) U.S. Cl.
USPC .............................. 705/40; 705/30

(58) Field of Classification Search
USPC .......................................................... 705/35
See application file for complete search history.

(56) References Cited

U.S. PATENT DOCUMENTS

| | | | |
|---|---|---|---|
| 5,121,945 A | 6/1992 | Thomson et al. | |
| 5,920,847 A | 7/1999 | Kolling et al. | |
| 5,940,813 A | 8/1999 | Hutchings | |
| 6,070,150 A | 5/2000 | Remington et al. | |
| 6,223,168 B1 | 4/2001 | McGurl et al. | |
| 6,363,362 B1 | 3/2002 | Burfield et al. | |
| 6,832,212 B1 | 12/2004 | Zenner et al. | |
| 6,856,970 B1 | 2/2005 | Campbell et al. | |
| 2001/0039522 A1* | 11/2001 | Saxon | 705/30 |
| 2002/0007302 A1 | 1/2002 | Work et al. | |
| 2002/0038305 A1 | 3/2002 | Bahl et al. | |

(Continued)

FOREIGN PATENT DOCUMENTS

WO    WO 97/29445    *    8/1997

OTHER PUBLICATIONS

Chicor Solutions, Chicor Information Management Inc., www.chicor.com.*

(Continued)

*Primary Examiner* — Robert R Niquette

(74) *Attorney, Agent, or Firm* — McAndrews, Held & Malloy, Ltd.

(57) ABSTRACT

A system and method for automated adjustment processing using pre-configured sets of business rules is provided. The seller pre-configures a set of business rules for use in processing an adjustment for a specific buyer. The set of business rules may be variable for each buyer and/or globally set. When a payment is received from a seller and an adjustment is required, an adjustment management application retrieves the buyer's set of business rules from the seller. The set of business rules are then applied to attempt to match the received payment to one of the buyer's outstanding invoices. If the match is successful, the buyer's payment is processed.

37 Claims, 5 Drawing Sheets

U.S. PATENT DOCUMENTS

| | | | |
|---|---|---|---|
| 2002/0052846 A1 | 5/2002 | Takatsu | |
| 2002/0107794 A1* | 8/2002 | Furphy et al. | 705/40 |
| 2002/0111906 A1 | 8/2002 | Garrison et al. | |
| 2002/0116334 A1 | 8/2002 | Bennett et al. | |
| 2002/0138426 A1 | 9/2002 | Craddick | |
| 2002/0194125 A1 | 12/2002 | Shimada | |
| 2003/0018550 A1 | 1/2003 | Rotman et al. | |
| 2003/0158811 A1 | 8/2003 | Sanders et al. | |
| 2004/0010465 A1 | 1/2004 | Michalski et al. | |
| 2004/0093278 A1 | 5/2004 | Burchetta et al. | |
| 2004/0148234 A1 | 7/2004 | Gonen-Friedman et al. | |
| 2005/0075978 A1* | 4/2005 | Leavitt et al. | 705/40 |
| 2005/0125340 A1 | 6/2005 | Lin et al. | |
| 2005/0177507 A1* | 8/2005 | Bandych et al. | 705/40 |
| 2006/0112010 A1* | 5/2006 | Leavitt et al. | 705/40 |
| 2006/0116956 A1* | 6/2006 | Leavitt et al. | 705/40 |
| 2009/0024500 A1* | 1/2009 | Kay et al. | 705/35 |

OTHER PUBLICATIONS

Irwin, Timothy et al. Managing Government Exposure to Private Infrastructure Risks. The World Bank Observer. vol. 14, No. 2 (Aug. 1999), pp. 229-245. .COPYRGT. 1999.*

ChiCor Solutions Website (1999).
Office Action dated Jan. 3, 2008, for U.S. Appl. No. 10/865,997, filed Jun. 10, 2004.
Office Action, dated Apr. 21, 2008, for U.S. Appl. No. 10/866,015, filed Jun. 10, 2004.
International Preliminary Report on Patentability for International application No. PCT/US2004/030255, mailed Aug. 3, 2006.
International Search Report for International application No. PCT/US04/30255, mailed Jun. 14, 2006.
International Preliminary Report on Patentability for International application No. PCT/US2004/030113, mailed Aug. 24, 2006.
International Search Report for International application No. PCT/US04/30113, mailed Jul. 28, 2006.
International Preliminary Report on Patentability for International application No. PCT/US2004/030112, mailed Aug. 3, 2006.
International Search Report for International application No. PCT/US20041030112, mailed Jun. 21, 2006.
Declaration for Application No. EP 04 78 4086, mailed Jan. 4, 2007.

* cited by examiner

SYSTEM AND METHOD FOR AUTOMATED PAYMENT AND ADJUSTMENT PROCESSING

CROSS-REFERENCE TO RELATED APPLICATIONS

The present application is a continuation of U.S. patent application Ser. No. 10/865,076, filed Jun. 10, 2004, entitled "System and method for automated payment and adjustment processing" which is hereby incorporated by reference in its entirety and which claims the benefit of U.S. Provisional Application No. 60/508,221 filed Oct. 2, 2003, entitled "Adjustment Management System and Method." This application is related to U.S. patent application Ser. No. 10/865,015, filed Jun. 10, 2004, entitled "System and Method for Automated Incoming Payment and Invoice Reconciliation" and U.S. patent application Ser. No. 10/865,997 filed Jun. 10 2004, entitled "System and Method for Seller-Assisted Automated Payment Processing and Exception Management."

BACKGROUND OF THE INVENTION

The present application generally relates to systems and methods for the management of exceptions such as adjustments or deductions taken by buyers with regard to payments sent to a seller. More specifically, the present application presents an automated system and method for processing adjustments such as deductions taken by a buyer or credits to a buyer with regard to payments sent to a seller, processing the transaction at the seller's side, closing out the transaction and updating the seller's accounting system.

FIG. 1 illustrates a typical transaction 100 for the purchase of goods according to the prior art. As shown in FIG. 1, the transaction involves a buyer 110, a seller 130, and a financial institution 120. Typically, the buyer 110 sends a purchase request 102 or purchase order to the seller 130. The purchase request 102 identifies the goods the buyer 110 desires. The seller 130 receives the buyer's purchase request and then ships the goods to the buyer 110.

Along with or separate from the goods, the seller 130 may send a statement or an invoice 105. The invoice 105 typically lists the goods being shipped and may include other information such as price, quantity, a seller coding or identification such as a SKU number and/or other order information. Alternatively, instead of a single invoice for a single shipment, a statement reflecting multiple shipments may be employed in situations where multiple shipments are sent to the same buyer.

Once the buyer 110 has received the seller's goods and invoice 105, the buyer 110 must pay for the goods at that time or at some time thereafter. Presently, in many cases, buyers pay for goods using any of a variety of methods including cash, checks, credit cards, Automated Clearing House (ACH) or other electronic/wire transfer. Regardless of the method of payment, the buyer's payment and/or information is remitted to the financial institution 120 as remittance information 115. In some cases the payment and/or information is sent initially to the seller 130, who then passes it along to the financial institution 120.

The financial institution 120 receives the buyer's payment and remittance 115 and deposits the funds in seller's account at the financial institution 120. The financial institution 120 then alerts the seller 130 that a payment has been received by sending payment data 125 to the seller 130.

The payment data 125 may take the form of a monthly, weekly, or typically a daily account summary. In the most preferable configuration, the account summary is updated several times a day. The payment data may also be electronically sent to the seller 130 or may be provided to the seller 130 by allowing the seller to electronically access the financial institution's records or photocopies may be mailed to the seller 130.

Additionally, as mentioned above, the buyer's payment may be received in any of a variety of methods. However, regardless of the type of payment received, the payment is typically converted to an electronic expression by the financial institution. For example, a paper check that is received by the financial institution may be scanned or imaged and the payment data on the face of the check may be converted into an electronic expression by a data entry person at the financial institution 120. ACH or wire transfers are already in an electronic form, but the financial institution's record of the transaction may also reflect the originator of the ACH and the date of the ACH, for example. Typically, most of the bank's electronic data is sent to the seller 130 as the payment data 125.

Once the payment data 125 has been received by the seller 130, the seller 130 must then begin the laborious task of matching each received payment with the corresponding invoice. That is, in order to confirm that the buyer 110 has paid for the goods that were shipped, the seller 130 matches the payment data 125 received from the financial institution 120 to the invoice data 105 that was sent to the buyer 110. Once the seller 130 has matched the invoice data 105 to the payment data 125, the transaction is said to be closed-out, provided that the invoice data matches the payment data exactly. For a seller with a large number of invoices, this process may be very time consuming.

Additionally, until the payment data 125 has been successfully matched to the invoice data 105 by closing out the transaction, the seller 130 does not know whether the correct payment has been received from the buyer 110. The buyer 110 may have over or underpaid, for example. Consequently, until the transaction has been closed out, the seller 130 can not be sure whether the current balance reflected in the seller's account at the financial institution 120 represents available cash or whether some amount is due back to the buyer 110 as an overpayment, for example.

As may be expected, matching payment data to invoice information may be quite time consuming, especially when the seller 130 is shipping goods to a large number of buyers 110. Additionally, matching payment data to invoice information may be further complicated by the time lag between the time the invoice 105 was sent to the buyer 110 and the time the payment data 125 was received by the seller. Additionally, matching payment data to invoice information may be further complicated because the received payment data 125 may not match the invoice 105.

That is, the buyer may submit a payment that differs from the invoiced amount. The payment submitted by the buyer may be less than or greater than the invoiced amount. For example, the payment submitted by the buyer may be less than the invoiced amount when the buyer's payment is not for all of the goods, for example, such as when some of the goods are not received or are damaged. Additionally, the buyer's payment may be less than the invoiced amount due to a disagreement as to price or quantity of goods or of a discount received by the buyer. Conversely, the payment submitted by the buyer may be greater than the invoiced amount due to errors by the buyer such as typographical errors or billing discrepancies or when the buyer pre-pays or over pays.

When a payment received from a buyer does not match the seller's invoice, an adjustment to the invoice is typically made. When the adjustment results in a lessening of the invoice amount, the adjustment is referred to as a deduction (also known as a chargeback or dispute). Typically, the customer demands an adjustment. This demand for an adjustment is commonly referred to as an adjustment request. Though a deduction doesn't necessarily have to reference a specific seller's invoice, adjustment requests are typically in the form of a deduction in the invoice amount. For example, when a customer receives damaged goods, he or she demands that the invoice amount be reduced to reflect that the good had been damaged, and therefore demands an adjustment request in the form of a deduction in the invoice amount. Additionally, the buyer's payment may not match the seller's invoice if the seller's invoice was in error from the start. Alternatively, a buyer's invoice may be given an adjustment such as a buyer-specific discount, for example.

An adjustment request may be in several forms. For example, the adjustment request may be a phone call from the buyer to the seller requesting an adjustment. Also, the adjustment request may be a letter or email from the customer to the seller. In addition, the adjustment request may be the invoice with the demand for a refund of overpayment or deduction in the invoice amount written on the invoice. Alternatively, the adjustment request may also be any form of electronic communication such as electronic data from a website.

Once the adjustment request has been received by the seller, the adjustment request is typically passed to a human for review. The reviewers are individuals who review the adjustment request and the relevant documents in order to approve or deny the adjustment request. The consent of more than one reviewer may be necessary to allow a particular customer to make an adjustment. Once all of the reviewers have reviewed the adjustment request and all the relevant documents, the adjustment request is either approved or denied.

If the seller approves the adjustment request, the seller either issues a credit to the customer. Re-invoicing the buyer typically has a similar effect on the seller's accounting system as issuing a credit to the customer. Conversely, if the customer requests an adjustment in the form of a deduction in the invoice amount, and the adjustment request is approved by the seller, the seller reduces the invoice amount and accepts a lower payment from the buyer.

FIG. 2 illustrates a typical work flow 200 for a processing a transaction for selling goods. First, at step 210, the sell side 201 sends an invoice to the buy side 202. Next, at step 220, the invoice is initially reviewed by the buyer. Any disputes are handled in step 230, for example by making an adjustment. Also at step 230, any dispute or adjustment is reviewed and approved by the buyer. As discussed further below and indicated in FIG. 2, the dispute and adjustment process may be quite time and labor consuming for the seller. Finally, at step 240, payment is sent from the buyer to the seller.

Note that in step 240, the payment received from the buyer is often manually matched to an invoice at the seller, which is quite time consuming. Even if some data is electronically provided, the buyer's payment systems are typically not equipped to process the received data without substantial human interaction. Additionally, at step 230, the adjustment or dispute process is identified as labor intensive and lengthy for both the buyer and the seller.

Thus, current systems for resolving adjustments are overly costly for a number of reasons. First, there is an abundance of information to monitor. This information includes customer information, invoice information, the cause for the adjustment request (i.e., whether a deduction or overpayment refund is being sought), past invoices of the customer, past adjustment requests from the customer, and the customer's credit line with the seller, and may include other information.

Second, in large businesses, there is often an inability to ensure that all of the relevant departments of the seller (for example, the accounting department, shipping department, and credit department, among others) are able to review, edit, and approve or deny the adjustment request. This inability to ensure that all of the relevant departments of the seller review the adjustment request stems from the manual coupling of the adjustment request and the relevant documentation, as discussed above. Undoubtedly, errors occur on a frequent basis where, for example, a reviewer does not receive all of the documentation that he requires to properly review the adjustment request.

In a related problem, third, it may be very difficult to ensure that all relevant departments of the seller perform their reviews in a timely manner, especially when several departments are involved. For example, delay in ensuring that a first reviewer receives all of the documentation required for his review of the adjustment request will cause further delay for subsequent reviewers. In this way, when other reviewers are waiting for the first reviewer to complete his review of the adjustment document and relevant documentation, delay in the processing of the adjustment request ensues. This delay becomes even more troublesome when multiple levels of review (that is, one reviewer must wait and review a first reviewer's resolution of the adjustment request) are required by the seller. For example, where a seller requires that all initial reviews of an adjustment request be reviewed by a manager of reviewers, any delay in routing the information to, and receiving a resolution from, one or more of the reviewers will only cause additional delay.

Finally, any delay in ensuring that all relevant departments review the adjustment request will cause additional delays in pursuing collection of a debt owed by a customer or in issuing a refund owed to a customer. This can cause business losses due to lengthy collection delays and a loss of customer goodwill. In addition, current systems and methods do not provide for integration between the adjustment management system and method and the bank of the seller. This, in turn, causes additional delay in the final resolution of adjustment requests. This delay will be because the seller will have to notify the customer, who will then have to send payment to the seller. In a similar manner, any posting of money owed to the customer will also be delayed.

Thus, a need has long been felt for a sales adjustment management solution that eliminates or minimizes many of the problems associated with current systems. A need has especially been felt for such a system that is capable of handling a large number of adjustment requests in order to reduce unnecessary write-offs by a seller. Also, a need has long been felt for a system to reduce the labor and time investment for processing the adjustments. Additionally, a need has long been felt for a flexible system that may be used to process a wide variety of adjustment requests. Finally, a need has long been felt for an adjustment system that is directly integrated with the seller's financial institution.

BRIEF SUMMARY OF THE INVENTION

The embodiments of the present invention provide a system and method for automating the processing of adjustments for a payment received from a buyer by using a pre-configured set of business rules selected by the seller for that buyer. That is, the seller pre-configures a set of business rules for use in processing adjustments for a specific buyer. Each buyer may have its own individually configured set of business rules. When a payment is received at a seller from a buyer that does not exactly match any of the outstanding invoices for the buyer, an adjustment management application at the seller applies the set of business rules for the buyer. The adjustment management application then attempts to match the received payment to one of the buyer's outstanding invoices using the buyer's set of business rules. If the adjustment management application is successful in finding a match, the buyer's payment is automatically posted. If the adjustment management application is not successful in finding a match, the buyer's payment is selected for further processing, for example, the payment may be routed to a human reviewer.

DETAILED DESCRIPTION OF THE INVENTION

Figure 1:
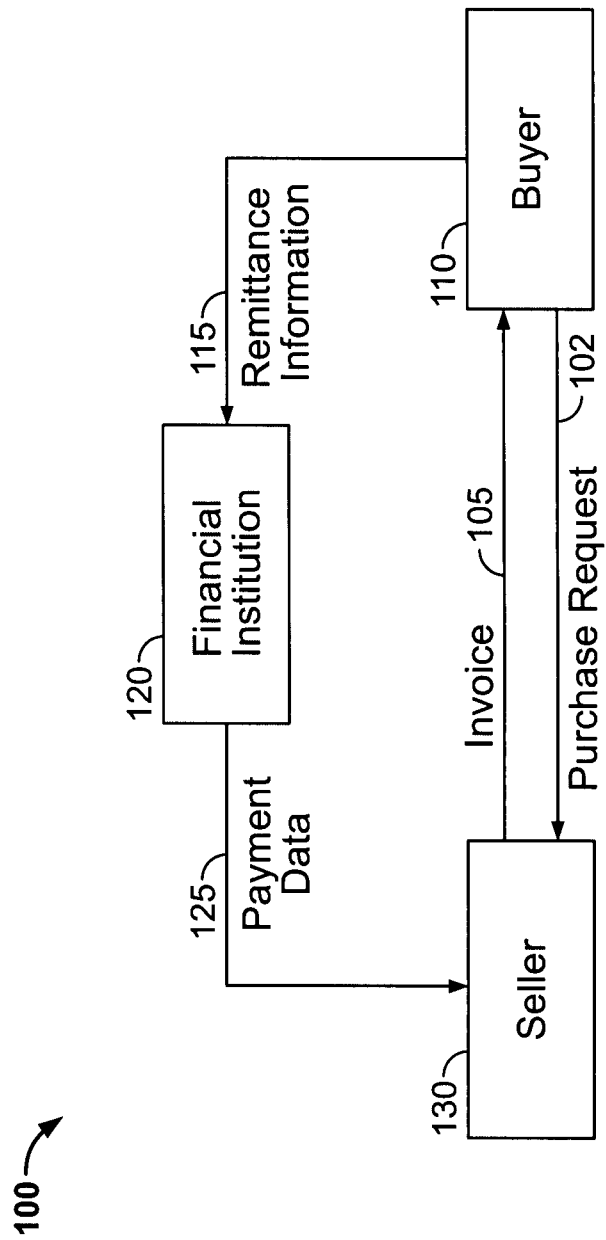
FIG. 1 illustrates a typical transaction for the purchase of goods according to the prior art.
Figure 2:
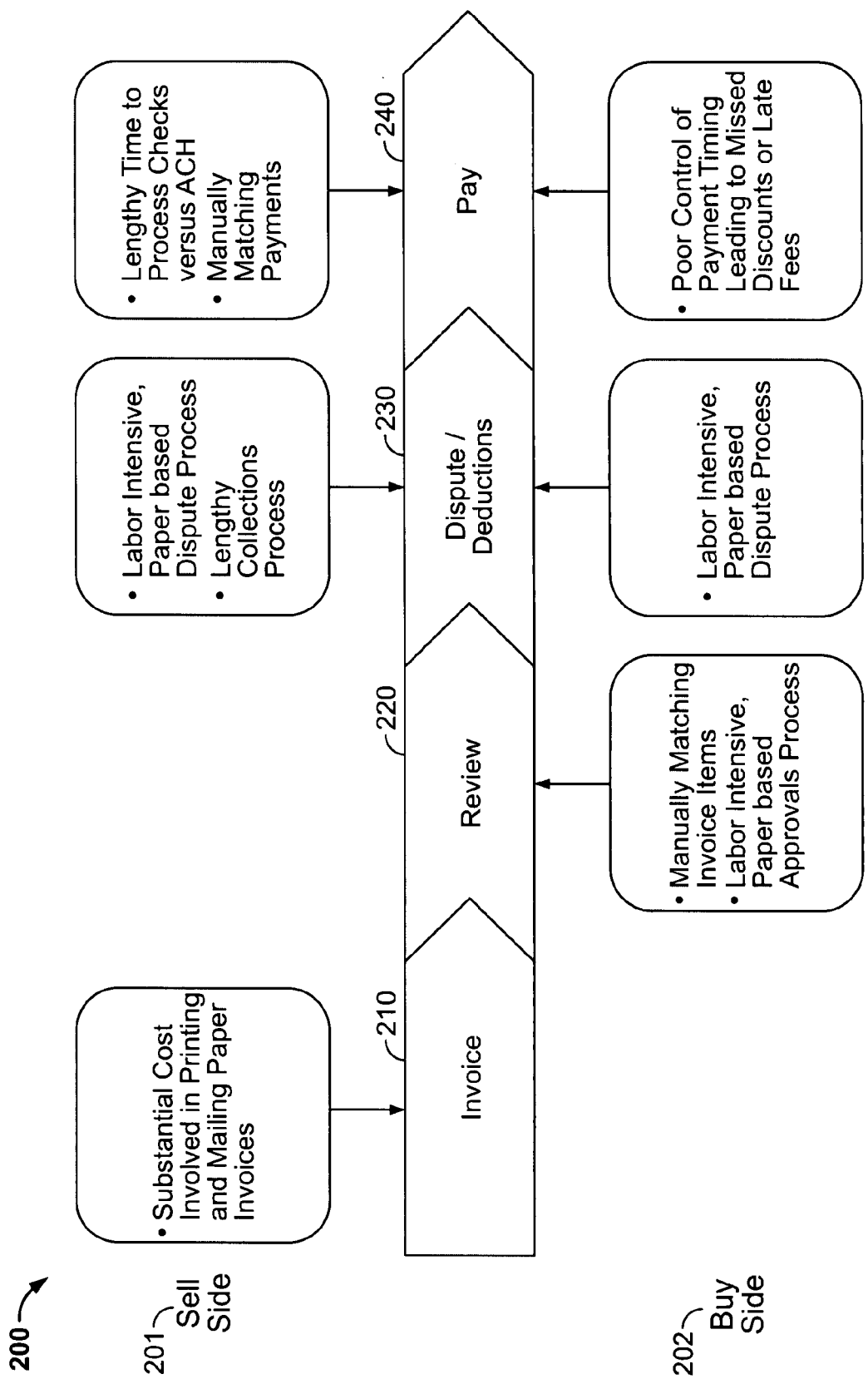
FIG. 2 illustrates a typical work flow for a processing a transaction for selling goods.
Figure 3:
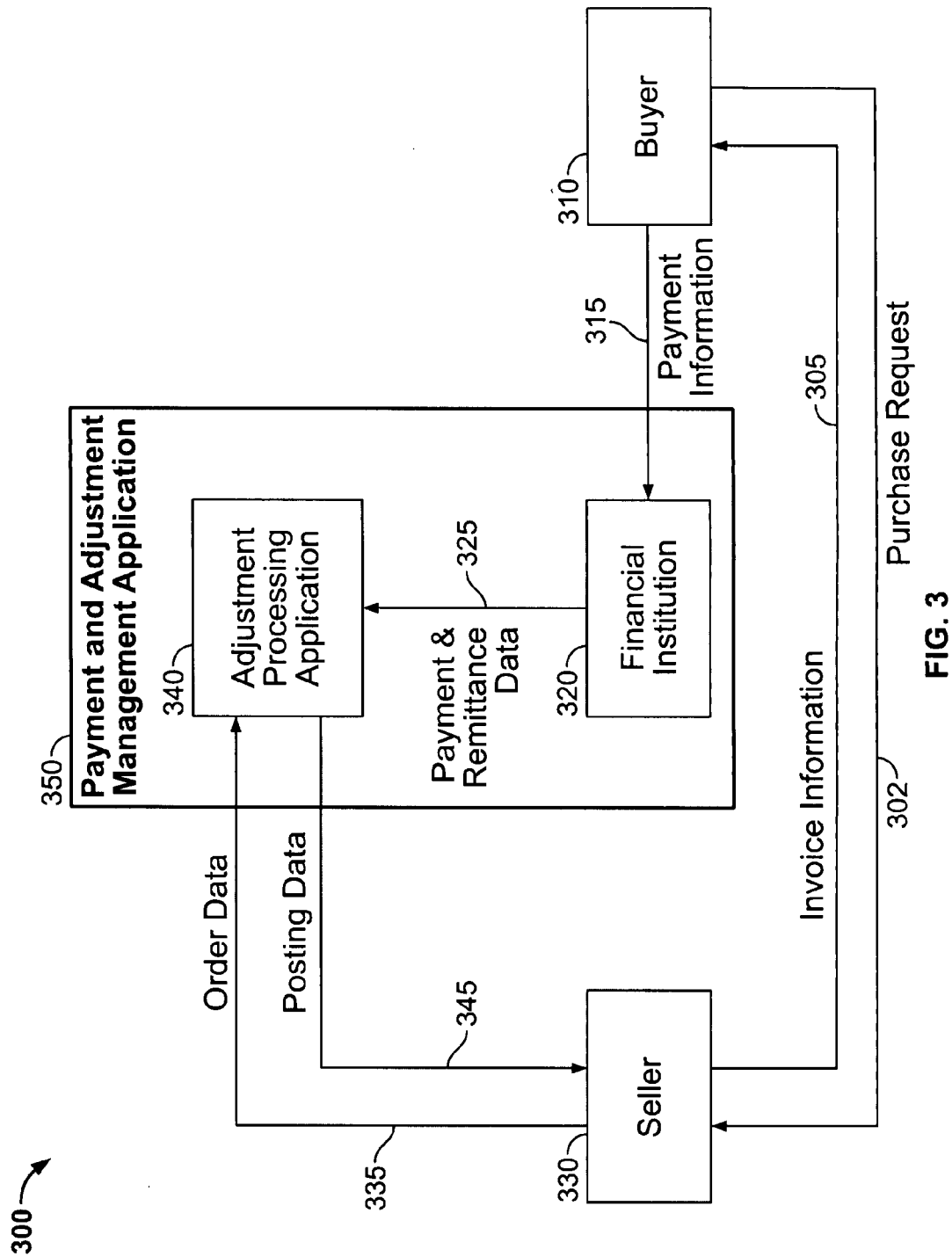
FIG. 3 illustrates an automated adjustment management system according to an embodiment of the present invention.

FIG. 3 illustrates an automated payment processing and exception management system 300 according to an embodiment of the present invention. The payment processing and exception management system 300 includes a buyer 310, a financial institution 320, a seller 330, an adjustment processing application 340, and a payment and adjustment management application 350. The payment and adjustment management application 350 includes the financial institution 320 and the adjustment processing application 340.

As further described below, a purchase request 302 travels from buyer 310 to the seller 330. Invoice information 305 travels from the seller 330 to buyer 310. The invoice information 305 may travel separate from the goods and/or services provided by the seller 330, or may travel along with the goods and/or services. Payment information 315 is sent from buyer 310 to the seller's financial institution 320. Payment and remittance data 325 is sent from the financial institution 320 to the adjustment processing application 340. Order data 335 is sent from the seller to the adjustment processing application 340. The order data 335 may be sent to the adjustment processing application 340 when the underlying goods are invoiced to the buyer, or may be sent to the adjustment processing application 340 at some later time. The posting data 345 is sent from the adjustment processing application 340 to the seller 330.

In operation, the payment processing and exception management system 300 proceeds generally as follows. First, the buyer 310 may decide to purchase goods, for example, from the seller 330. Typically, the buyer 310 then notifies the seller 330 that the buyer 310 wishes to make a purchase by sending a purchase request 302 to the seller 330. The seller 330 then receives the buyer's purchase request 302. The seller 330 then ships the desired goods to the buyer 310 and also sends invoice information 305 to the buyer 310.

The invoice information 305 preferably includes information relating to the goods that were shipped from the seller 330 to the buyer 310. For example, the invoice information 305 preferably includes a seller coding identifying the goods being shipped, the price, quantity, and/or other order information.

As mentioned above, the invoice information 305 and the goods are received by the buyer 310. The buyer 310 then reviews the received goods. The buyer 310 preferably then pays for the received goods. However, the amount of the buyer's payment may differ from the payment amount invoiced by the seller 330 for a variety of reasons.

For example, if the received goods do not match the goods identified in the invoice information 305, the buyer's payment may differ from the invoice. Additionally, for example, some of the goods may be damaged or destroyed. Alternatively, the agreed price or quantity of the actual goods received may not match the price or quantity of the goods appearing in the invoice information. Additionally, the seller may have shipped goods other then the goods desired by the buyer. These are merely a few examples of the myriad difficulties that may be encountered in shipping the goods to the buyer that may result in a departure from the invoice information 305.

Returning to FIG. 3, once the goods have been received by the buyer 310, the buyer then pays for the goods by transmitting payment information 315 to the financial institution 320. That is, the buyer 310 submits payment information 315 including a payment to the seller's financial institution 320. However, as shown in FIG. 3, the present embodiment operates to transform the financial institution 320 into a payment and adjustment management application 350 by integrating the financial institution 320 with the adjustment processing application 340.

That is, once the goods have been received by the buyer 310 or in accordance with the terms of the accompanying invoice, the buyer then pays for the goods. However, if one or more of the above-mentioned difficulties with the goods has occurred, the amount that the buyer may submit as payment may differ from the amount included in the invoice information 305. When the payment amount submitted by the buyer 310 differs from and is less than the payment amount included in the invoice information 305, the difference in the payment amounts is referred to as a deduction.

As mentioned in the background section above, when a buyer 310 takes a deduction in the typical fashion, the taking of the deduction necessitates a great deal of work for the seller. Typically, the seller must reconcile the payment amount received from the buyer with the goods and invoice information that were sent to the buyer, which may be a complicated and time-consuming process.

In a few of the previous systems, in order to reduce the amount of time spent reconciling the invoice information, the seller may request that the buyer submit a debit memo in order to allow the buyer to take a deduction, either manually or through a web site. Managing deductions by using such a form may assist a seller in its internal accounting, but may entail additional delay in approval by the seller and disbursement or credit to the buyer. Consequently, such a system is often viewed as onerous by both buyer and seller. In other previous systems, buyers may refuse to pay an invoice unless it is accurate, that is, unless a final revised invoice showing all adjustments has been received by the buyer, or a credit memo issued to offset the incorrect invoice, or a deduction is authorized prior to payment. However, such a system is typically viewed unfavorably by the seller because it typically involves an additional delay for payment.

Conversely, as shown in FIG. 3, the buyer 310 submits payment information 315 including a payment to the seller's financial institution 320. However, as shown in FIG. 3, the present embodiment operates to transform the financial institution 320 into a payment and adjustment management application 350 by integrating the financial institution 320 with the adjustment processing application 340.

That is, the buyer's payment and remittance information 315 is sent to the financial institution 320. The payment 315 may be any of a variety of forms ranging from cash or check to electronic fund transfers such as Electronic Data Interchange (EDI), for example. The financial institution 320 receives the payment and remittance information 315 and generates the payment and remittance data 325. The payment and remittance data 325 preferably includes all of the payment and remittance information and may include additional remittance data such as scanned images of received checks, received remittance advices, and/or debit memos. The payment and remittance data 325 is then sent to the adjustment processing application 340.

In addition to the payment and remittance data 325, the adjustment processing application 340 also receives order data 335 from the seller 330. The order data 335 preferably includes three types of information, invoice-related information, buyer-related information and seller-related information and may include additional information.

With regard to invoice-related information, the order data 335 preferably includes all of the information that was included in the invoice information 305 that was sent to the buyer 310, and may also include information relating to the transfer of the goods such as a bill of lading or electronic images of the invoice information 305.

That is, one element of the payment and remittance data 325 preferably identifies the buyer making the payment. Preferably, the outstanding invoices have been previously sent or pre-delivered to the adjustment processing application 340, for example at the time the invoice was originally sent to the buyer. If the adjustment processing application 340 is unable to find a particular invoice for a particular seller, then the adjustment processing application 340 may default to a standard deduction form, as further described below. Alternatively, the adjustment processing application 340 may then query the seller 330 and retrieve a listing of all outstanding invoices for the indicated buyer as order data 335. If no buyer is indicated in the payment data 325, the adjustment processing application 340 may preferably retrieve all outstanding invoices for all buyers. That is, the payment and remittance data 325 preferably indicates the buyer. The adjustment processing application 340 may then query the seller 330 for any information related to that buyer. Additionally, the adjustment processing application 340 may retrieve the data from the seller 330 in any of a variety of ways. For example, order data 335 may be received by the adjustment processing application 340 as a batch of information representing several invoices for one or more buyers as opposed to information for a single invoice of a buyer. Additionally, the payment information 315 received from the buyer 310 may represent a batch of several invoices instead of a single invoice.

With regard to buyer-related information, the order data 335 also preferably includes information relating to the buyer itself, such as the number of previous orders by the buyer, any negotiated discounts that apply to the buyer or other incentives, for example, as further described below.

With regard to the seller-related information, the order data 335 may include information with regard to the seller such as the salesperson that originated the order or internal routing information for adjustment approval, for example, as further described below.

Once the adjustment processing application 340 receives the payment and remittance data 325 and the order data 335, the adjustment processing application 340 then proceeds to attempt to match the received payment and remittance data 325 to one or more of the outstanding invoices retrieved from the order data 335.

As further described below with regard to FIG. 6, if the payment data 325 is immediately matchable to one or more invoices, the adjustment processing application 340 sends an indication of the successful match to the seller 330 as posting data 345. The posting data 345 preferably indicates which invoice or invoices are being paid by the payment data. The seller 330 receives the posting data 345 and the accounting system records at the seller 330 are then updated to reflect that the invoices(s) have been paid in order to close the transaction. Although the present discussion focuses on the operation of the adjustment processing application 340 on an invoice-by-invoice basis, the adjustment processing application may also operate on a batch basis. For example, a batch of invoices may be processed at one time. The batch of invoices may be sent to the seller at one time as batch after all invoices have been matched and/or all exceptions to the invoiced handled as further described below. For example, the adjustment processing application 340 may process the batch of invoices, match the invoices that it is able to match, and then concentrate on classifying the exceptions in the remaining invoices before passing the entire batch of invoices to the seller as further described below. A reviewer at the seller may then further review, modify and/or approve/reject the exceptions.

If the payment data 325 is not immediately matchable to one or more invoices, then the seller may be claiming an adjustment or an error has occurred and the adjustment processing application 340 may then flag the payment data for further processing as further described below with regard to FIG. 6.

The adjustment processing application 340 may then attempt to apply a set of seller-configurable business rules to the payment data in order to attempt to automatically resolve and process the adjustment, as further described below. For example, the adjustment processing application 340 may be configured with a set of rules for each buyer so that adjustments below a certain threshold or less than a certain percentage of an invoice amount are automatically granted.

If the adjustment management application 340 is unable to automatically resolve the adjustment, after the application of the business rules, the payment and remittance data may be referred to the seller for further processing.

The operation of the initial invoice and payment matching is further described in U.S. patent application Ser. No. 10/865,015, filed Jun. 10, 2004, entitled "System And Method For Automated Incoming Payment and Invoice Reconciliation", which is incorporated herein by reference in its entirety.

Once the adjustment processing application 340 has processed the payment and remittance data 325 and order data 335 and the buyer's adjustment has been resolved, the adjustment processing application 340 sends posting data 345 to the seller 330. As further described below, the posting data 345 may take any of several forms such as an instruction to create a credit memo, an adjustment to inventory, or an instruction to forward the deduction to collections.

As mentioned above, the invoice information 305 may take any of several forms. For example, the invoice information 305 may be a paper document or an electronic document such as an e-mail, web-enabled form, or other EDI information exchange.

Although the present embodiment is discussed above in relation to the buyer ordering goods, the buyer may instead be interested in securing services. Similar considerations arise in the context of procuring services with regard to adjustment management. Although the current description focuses on goods, the present payment processing and exception management system applies equally well to services and is not limited to goods.

As mentioned above, the invoice information may include a great deal of information as further described below. However, not all of the items of information listed below need be present in the invoice information. The inclusion of an item as part of the invoice information may be configured by the seller. For example, the invoice information may include information concerning the quantity and price of goods and/or services sold by the seller 330 to buyer 310. The invoice information 305 may also include information such as the ship date, buyer's 310 name and address, the seller's 330 name and address, any amount of money that is past due from buyer 310 to the seller 330, or any available credit buyer 310 has with the seller 330. In addition, the invoice information 305 may include an invoice number to be used by the seller 330 for identification and tracking purposes. For example, the invoice information 305 may include an invoice number so that the seller 330 may be able to track which goods and/or services have been delivered or provided to buyer 310. In addition, the invoice information 305 may also include a bill of lading and/or other documentation such as the freight bill, proof of delivery, and/or price quote.

Similar to the invoice information above, the payment information may take any of a wide number of forms as chosen by the buyer. For example, the payment information 315 may therefore include a check, a financial institution draft, a cashier's check, a money order, an order to charge a credit line, a promissory note, or any other document that shows payment for goods and/or services received. In addition, the payment information 315 may also include an electronic image of the form of payment. For example, the payment information 315 may include an electronic image of a check used to pay for the goods and/or services.

Further to the discussion above, the payment and remittance data are preferably constructed by the financial institution 320 to the extent that the payment data and/or remittance information is not already available from the buyer in electronic form. That is, the financial institution 320 may review incoming payment information, such as a check for example, and then develop a set of data relating to the check. For example, the financial institution 320 may electronically note the date of receipt, amount, payer, payee, and any account, MICR, or invoice numbers on the check. The financial institution may also electronically image the received check. The notations made by the financial institution 320 may then be passed to the adjustment management application as part of the payment and remittance data 325.

Alternatively, if the payment information is electronically delivered to the financial institution 320, the payment information may take any of a wide variety of forms. The financial institution 320 typically processes the received payment information and re-expresses or re-formats the payment information to be in accordance with the financial institution's internal processing desires. The reprocessed electronically received payment information may then be passed to the adjustment processing application 340 as part of the payment and remittance data.

The payment and remittance data itself may take any of a wide variety of forms as selected by the financial institution 320. For example, the payment and remittance data 325 may alternatively be comprised of XML documents, EDI documents, information from internet-based financial services, or any other form of electronic data relating to the payment of goods or services.

The order data 335 and posting data 345 may also take any of wide variety of forms such as e-mail, XML documents, HTML documents, or EDI, for example.

Additionally, the adjustment processing application 340 may be implemented, for example, as a package software application or installed at a financial institution or other third party as an application service provider (ASP). As an ASP, the adjustment processing application 340 may be directly hosted by the financial institution 320, the seller 330 or a third party. The actual physical location of the adjustment processing application 340 is not relevant as long as it remains in communication with the financial institution 320 and the seller 330. For example, the adjustment processing application 340 may be hosted or installed at a third party or may be otherwise outsourced.

Figure 4:
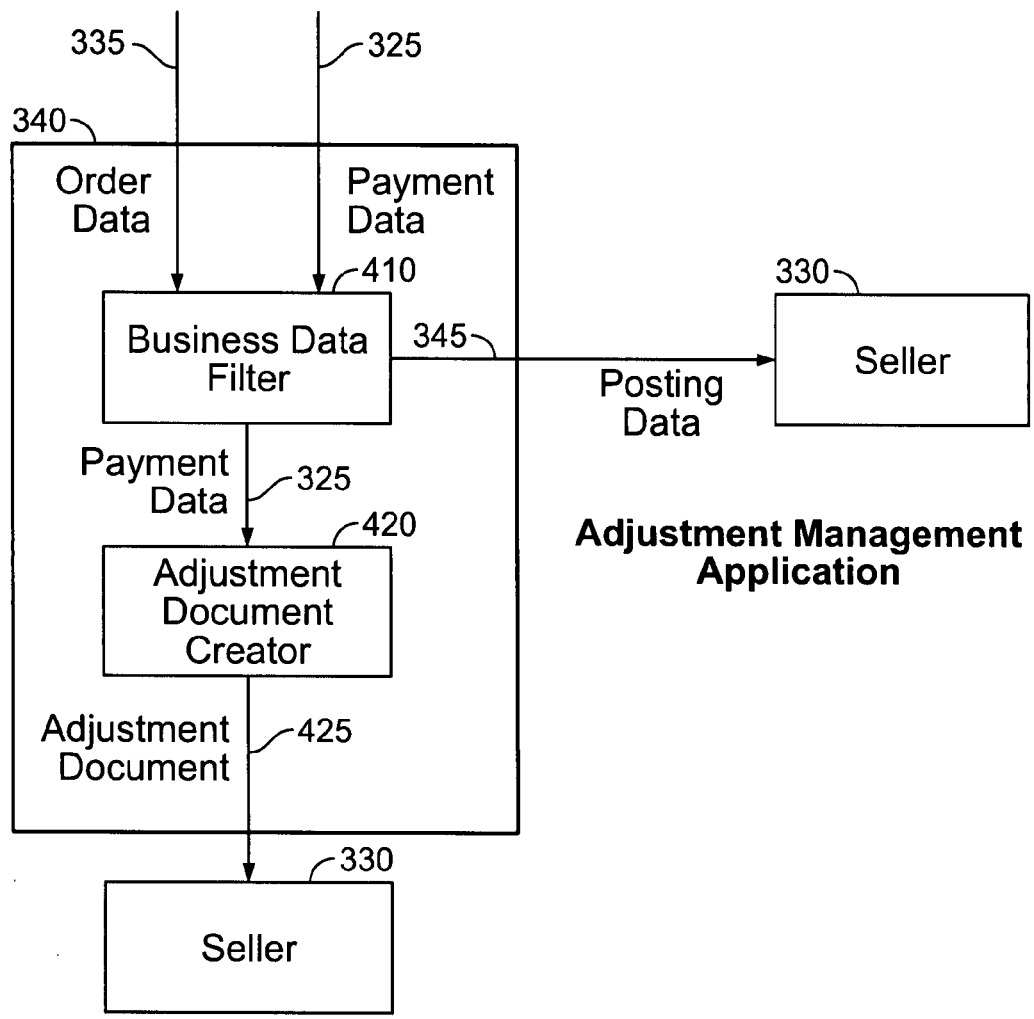
FIG. 4 illustrates an embodiment of the adjustment management application of FIG. 3 in greater detail.

FIG. 4 illustrates an embodiment of the adjustment management application 340 of FIG. 3 in greater detail. As shown in FIG. 4, the adjustment management application 340 includes a business data filter 410 and an adjustment document creator 420. As discussed above with regard to FIG. 3, the adjustment management application 340 receives the payment and remittance data 325 from the financial institution 320 and the order data 335 from the seller 330. The payment and remittance data 325 and order data 335 are then passed to the business data filter 410 of the adjustment management application 340.

In operation, the business data filter 410 receives the order data 335 and the payment and remittance data 325 and attempts to match the payment and remittance data 325 with one or more invoices included in the order data. If the business data filter 410 is able to match the payment and remittance data 325 with one or more invoices in the order data 335, the business data filter sends posting data 345 to the seller 330 to close out the transaction, as described above. If the business data filter 410 is not able to match the payment and remittance data 325 with one or more invoices in the order data 335, then the payment and remittance data 325 is further processed by the business data filter as described below with regard to FIG. 6.

For example, if the received order data matches an outstanding invoice number for a certain buyer and the amount of the received payment matches the invoiced amount, then posting data 345 is sent to the seller 330 to post the received payment to the seller's accounting system.

However, if the amount of the received payment does not match the invoiced amount, then the business data filter 410 applies a series of business rules in order to attempt to match the order data 335 and the payment data 325, as further described below with regard to FIG. 6. If the business data filter 410 is able to find a match after the application of the business rules, then the business data filter 410 sends posting data 345 to the seller 330. Additionally, the business data filter 410 sends the payment data 325 to the adjustment document creator 420 so that an adjustment document may be created. The adjustment document 425 is then also sent to the seller 330. However, because the buyer's adjustment has satisfied the business rules, the buyer's adjustment may be automatically accepted by the seller without further human interaction or approval.

If the order data and payment data still do not match after the application of the business rules in the business data filter 410, then the payment data 325 is still sent to the adjustment document creator 420 and an adjustment document is generated. However, the adjustment document that is created may not be automatically processed by the seller's accounting system because the adjustment did not satisfy the business rules. Additionally, the business rules applied by the business data filter may preferably be configured to be buyer specific, as further described below.

The structure of the adjustment approval forms and the routing of the approval forms are further described in U.S. patent application Ser. No. 10/865,997, filed Jun. 10, 2004, entitled "System And Method For Seller-Assisted Automated Payment Processing and Exception Management", which is incorporated herein by reference in its entirety.

The adjustment document 425 preferably includes the payment data as well as all relevant data with regard to the buyer. The relevant data with regard to the buyer preferably includes the buyer's previous purchasing and payment activity including any credit rating, as well as seller-side information with regard to the buyer such as the seller's account representative for the buyer or any previous discounts given to the buyer.

The business data filter 410 may also seek to validate payment data when the buyer's information is missing from the transaction. For example, if the payment data does not include an indication of the buyer, the business data filter 410 may attempt to match the payment amount or any other available information to all outstanding invoices for all buyers. If a match is discovered, the business data filter 410 may automatically prompt the user to confirm the attempted match from secondary criteria, for example, non-invoice identification fields.

Preferably, the transaction verification provided by the business rules includes the validation of the following aspects of the transaction. Validation of the customer information of the buyer 310. Validation of the delivery information of the goods transferred to the buyer, preferably including, for example, the invoice and/or bill of lading, and the dollar amounts. Validation of the buyer's payment such as determining whether the buyer's payment is a duplicate of an already received payment or if the amount remitted by buyer differs from the invoiced amount by a sum less than a predetermined threshold tolerance, or if the total invoice amount is less then a predetermined amount.

Figure 5:
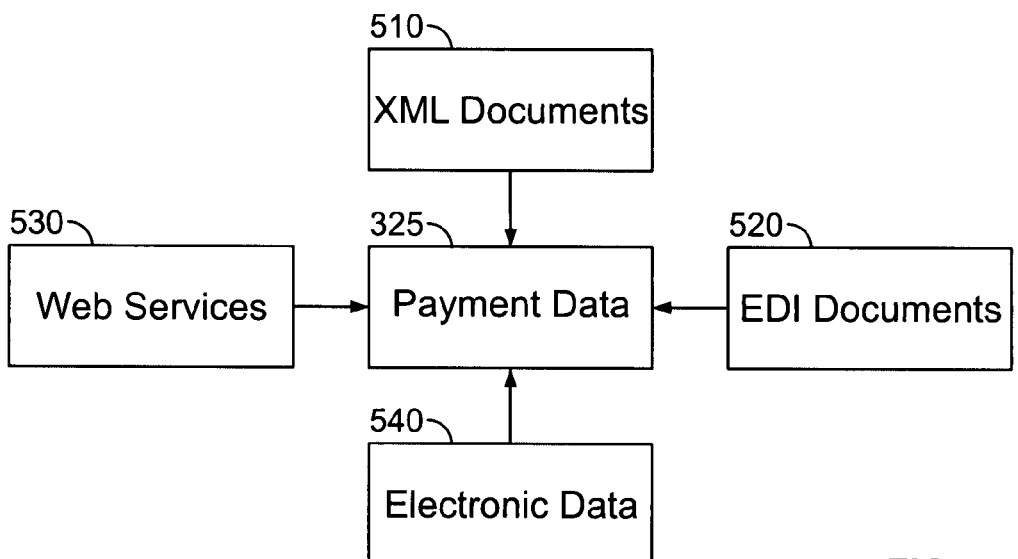
FIG. 5 illustrates an example of some of the types of informational sources that may be included in the payment data.

FIG. 5 illustrates an example of some of the types of informational sources that may be included in the payment data 325. As discussed above, the payment data 325 may include data derived from XML documents 510, EDI documents 520, electronic data 540, and/or data from web services 530. The electronic data 540 may include electronic images of the remittance information 315, as described in FIG. 3. The payment data 325 may be configured in any internal format desired by the financial institution that is capable of being parsed by the adjustment management application 340.

Thus, the present embodiment serves to automatically match payment data with invoice data. As mentioned above, the prior art methodologies for matching payment data with invoice data involved a great deal of manual effort and were quite slow. With the present embodiment, most incoming payments may be matched and processed automatically. Thus reducing effort and cost and providing a more accurate assessment of available cash.

Additionally, the present embodiment is preferably directly integrated with the seller's financial institution. Consequently, no additional processing steps to inform the financial institution or internal accounting sub-divisions of the seller's account at the financial institution are necessary.

Figure 6:
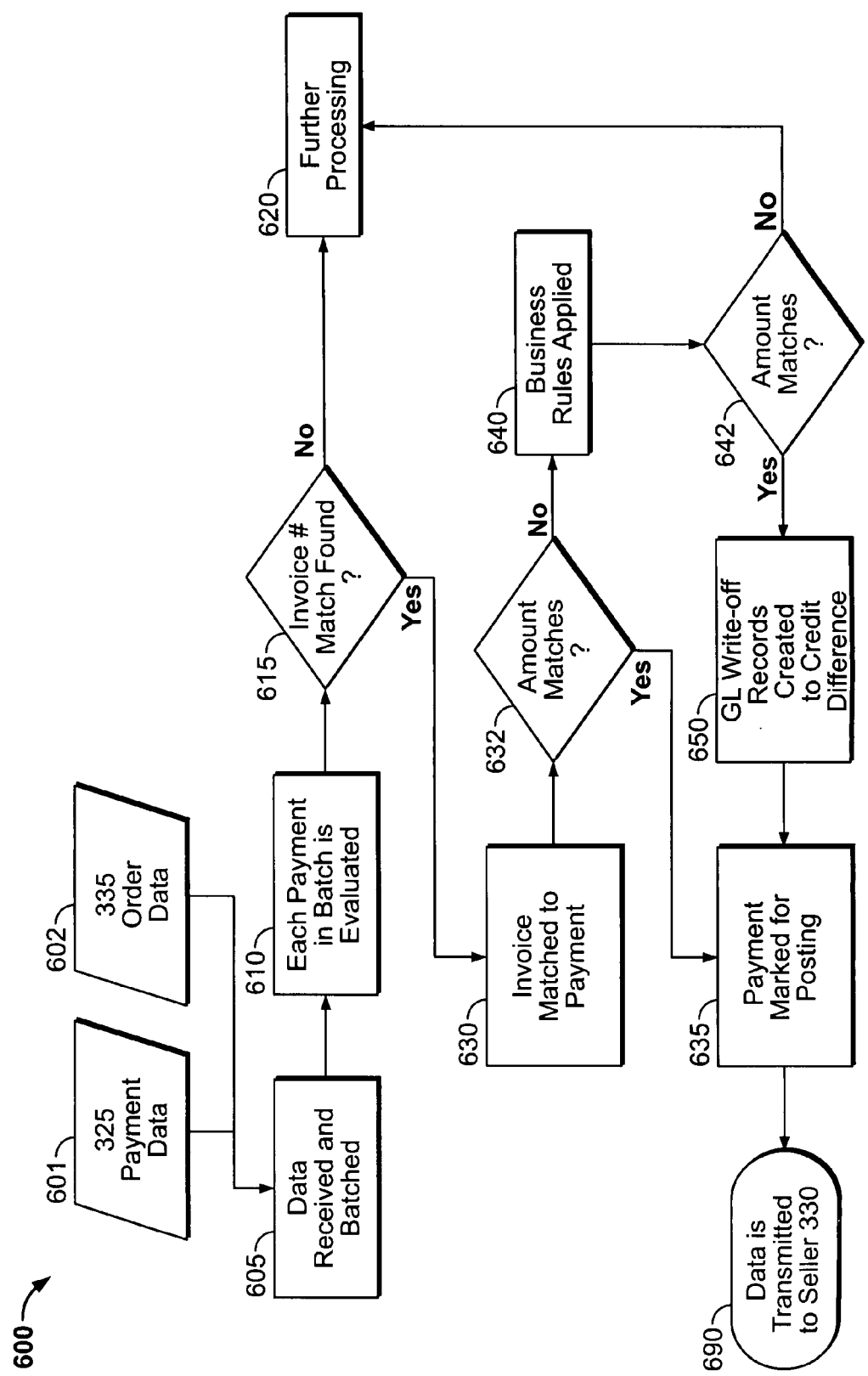
FIG. 6 illustrates a flowchart of the operation of the business data filter according to one embodiment of the present invention

FIG. 6 illustrates a flowchart 600 of the operation of the adjustment management application in greater detail. First, the payment data and the order data are received at steps 601-602. Next, at step 605, the payment data is received and batched by the financial institution. That is, the financial institution may accumulate a number of payments in a queue to form a batch. Then, a person at the seller may access the financial institution's records to process the batch of payments as a whole.

At step 610, each payment in the batch of payments is evaluated. Preferably, the payment data 601 includes invoice information linking a payment made by the buyer with a specific invoice number sent to the buyer by the seller. The listing of invoice numbers is preferably retrieved from the seller as part of the order data 602. At step 615, it is determined whether the payment includes an invoice number that matches an invoice number provided by the order data. If an matching invoice number is found, the process proceeds to step 630 and the invoice is matched to the payment. If no invoice number match is found, the process proceeds to step 620.

At step 620, additional processing, such as human interaction by the seller may be required to match the received payment data with one or more invoices retrieved in the order data. Such further processing is further described in U.S. patent application Ser. No. 10/865,997, filed Jun. 10, 2004, entitled "System And Method For Seller-Assisted Automated Payment Processing and Exception Management", which is incorporated herein by reference in its entirety.

Proceeding now to step 630, the received payment has been matched to a specific invoice number. Next, at step 632, the invoiced payment amount included in the invoice is compared to the received payment. If the received payment matches the invoiced payment, the process proceeds to step 635. At step 635, the payment is marked for posting to the seller's accounting system.

Conversely, if the received payment does not match the invoiced payment, the process proceeds to step 640. At step 640, business rules are applied in order to allow the payment to "match" the invoice even if the payment amount is not exactly the invoiced amount. For example, a global threshold may be set for the system so that even if the received payment differs from the invoiced payment amount, if the difference is small enough then the invoice and payment still are considered a match. For example, as a global threshold, if the received payment differs from the invoiced amount by less than 1% or by less than $100, the invoice and payment may still be considered to match. The global threshold is preferably set by the seller.

In addition to global business rules that may be applied to all buyers, buyer-specific business rules may be applied. For example, a buyer-specific threshold that is more generous than the global threshold may be employed instead of or in addition to the global threshold in order to allow the received payment and the invoice to match. For example, the seller may configure a buyer-specific threshold of 2% or $500 and as long as the payment received does not differ from the invoiced amount by more than the buyer-specific threshold, the payment is considered to match the invoice. Additionally, other buyer-specific criteria such as a discount or other incentive may be applied.

The business rules including the global and buyer-specific thresholds may be retrieved from the seller as part of the order data at step 602. Alternatively, the business rules may be retrieved from the seller when the process proceeds to step 640. As another alternative, the business rules may be stored in the adjustment management application and may be available to the seller for periodic updates. All of the business rules are preferably configurable by the seller.

Turning now to step 642, if the payment amount matches the invoiced amount after the application of the business rules, the process proceeds to step 650. At step 650, an adjustment document such as a G/L (General Ledger) write-off record is created to credit the difference between the invoiced payment and the received payment. The process then proceeds to step 635 and the payment is marked for posting. Once the payment is marked for posting, the posting data is transmitted to the seller at step 690.

If the invoice amount does not match after the application of the business rules, then the process proceeds to step 620 where further processing, such as human interaction by the seller may be required to match the received payment data with one or more invoices retrieved in the order data.

The buyer-specific information may be originated for a buyer either by a pre-existing default, by direct programming by the seller, or by an automated analysis of the behaviors of a set of buyers. For example, the business data filter may be configured to dynamically increase the threshold percentage or other thresholds based on the size of the most recent invoice or the size of the payment. Additionally, for example, the threshold percentage or other thresholds may be dynamically changed based on the length of the relationship between the buyer and seller.

Thus, the present system may provide for automated processing of payments from sellers when the sellers are claiming and adjustment such as a deduction. By automatically processing adjustments that fall within the pre-configured business rules, a large quantity of adjustments may be automatically handled by the system without requiring any human interaction. Instead, human interaction may only be required for the small number of adjustments that fall outside of the business rules. Consequently, because many adjustments/deductions may now be handled automatically, a significant cost reduction in worker-hours may be realized.

Additionally, the present system automatically updates the seller's accounting system to include adjustment documentation such as a write-off record in the event of a deduction. Consequently, even though the buyer's adjustment is automatically processed, a record of the buyer's adjustments is included in the seller's accounting system if needed, for example for review or compliance purposes.

Also, the present system may be directly integrated with the seller's financial institution. This allows for additional ease of implementation and speed of processing. However, the present system may also be hosted by a third party in communication with the financial institution and the seller.

The present embodiments may be most useful in a system that first attempts to automatically match all received payments with invoices, such the system further described in U.S. patent application Ser. No. 10/865,015, filed Jun. 10, 2004, entitled "System And Method For Automated Incoming Payment And Invoice Reconciliation", which is incorporated herein by reference in its entirety. The received invoices that are not able to be directly matched by the invoice reconciliation system may then be referred to the automated adjustment management system of the present embodiments. Additionally, if the present automated adjustment management system is unable to automatically process the buyer's adjustment, an adjustment document may be created and routed to a human for approval or further processing. Such a system is described in U.S. patent application Ser. No. 10/865,997, filed Jun. 10, 2004, entitled "System And Method For Seller-Assisted Automated Payment Processing And Exception Management", which is incorporated herein by reference in its entirety. Additionally, the present embodiment is preferably directly integrated with the seller's financial institution.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. A method for automated adjustment processing, said method including:
   receiving a payment at an automated adjustment processing computer system from a buyer computer payment system for a seller;
   receiving buyer-specific information at said automated adjustment processing computer system for said buyer from said seller, said buyer-specific information including at least one outstanding invoice for said seller and at least one buyer-specific business rule;
   receiving a global business rule for application to all buyers;
   applying said buyer-specific business rule and said global business rule to a comparison of said payment and said at least one invoice using said automated adjustment processing computer system,
   wherein said comparison includes determining a first difference amount between said at least one invoice amount and an allowed payment determined by said global business rule,
   wherein said comparison includes further includes determining a second difference amount between said at least one invoice amount and an allowed payment amount determined by said buyer-specific business rule ; and
   processing said payment using said automated adjustment processing computer system when the difference between said payment amount and said at least one invoice amount is less than both said first difference amount and said second difference amount,
   wherein said buyer-specific business rule is buyer specific and said buyer-specific business rule is established by said seller for said buyer,
   wherein said buyer-specific business rule is a buyer specific numeric threshold difference in the amount of said payment and said invoice.

2. The method of claim 1 wherein said buyer-specific business rule is a buyer specific discount to said invoice.

3. The method of claim 1 wherein said buyer-specific business rule is a buyer specific decision to allow said buyer to pay less than the total amount of said invoice.

4. The method of claim 1 further including:
   receiving an adjustment to said invoice before said receiving step; and
   applying said adjustment to said invoice before applying said buyer-specific business rule.

5. The method of claim 1 further including:
   transmitting said payment to a sales adjustment document creator when said payment does not match said at least one outstanding invoice within the criteria of said buyer-specific business rule.

6. The method of claim 5 further including:
   transmitting posting data to said seller to notify said seller that said payment does not match said at least one outstanding invoice.

7. The method of claim 1 wherein said processing is performed by an Application Service Provider (ASP).

8. The method of claim 1 wherein said processing is performed by a software application at a financial institution.

9. The method of claim 8 wherein said software application is web-based.

10. The method of claim 1 wherein said processing is performed by a software application that has been outsourced to a party other than said buyer and said seller.

11. The method of claim 10 wherein said software application is web-based.

12. A method for automated adjustment processing, said method including:
   receiving a payment at an automated adjustment processing computer system from a buyer computer payment system for a seller;
   receiving buyer-specific information at said automated adjustment processing computer system for said buyer from said seller, said buyer-specific information including at least one outstanding invoice for said seller and at least one business role;
   wherein said business rule is buyer specific and said business rule is established by said seller for said buyer,
   wherein said business rule is a buyer specific numeric threshold difference in the amount of said payment and said invoice;
   applying said business rule to a comparison of said payment and said at least one invoice using said automated adjustment processing computer system; and
   processing said payment using said automated adjustment processing computer system when said payment matches said at least one outstanding invoice within the criteria of said business rule,
   wherein said business rule criteria includes a numeric threshold, wherein said numeric threshold is automatically adjusted by said adjustment processing computer system based on at least one of the size of the most recent invoice and the size of the most recent payment.

13. A method for automated adjustment processing, said method including:
   receiving a payment at an automated adjustment processing computer system from a buyer computer payment system for a seller;
   receiving buyer-specific information at said automated adjustment processing computer system for said buyer from said seller, said buyer-specific information including at least one outstanding invoice for said seller and at least one business rule;
   wherein said business rule is buyer specific and said business rule is established by said seller for said buyer,
   wherein said business rule is a buyer specific numeric threshold difference in the amount of said payment and said invoice;
   applying said business rule to a comparison of said payment and said at least one invoice using said automated adjustment processing computer system; and
   processing said payment using said automated adjustment processing computer system when said payment matches said at least one outstanding invoice within the criteria of said business rule,
   wherein said business rule criteria include a numeric threshold, wherein said numeric threshold is automatically adjusted by said adjustment processing computer system based on the length of the relationship between said buyer and said seller,
   wherein said processing is performed by a software application at a financial institution.

14. The method of claim 13 wherein said software application is web-based.

15. A system for automated adjustment processing, said system including:
   a business data filter computer system receiving a payment from a buyer computer payment system for a seller and receiving buyer-specific information for said buyer from a seller computer system, wherein said buyer-specific information includes:
   at least one outstanding invoices for said seller; and
   at least one buyer-specific business rule, wherein said buyer-specific business rule includes a buyer-specific numeric threshold difference in the amount of said payment and said invoice and is established by said seller for said buyer,
   wherein said business data filter also receives a global business rule for application to all buyers,
   wherein said business data filter computer system determines a first difference amount between said at least one outstanding invoice and an allowed payment amount determined by said global business rule and
   determines a second difference amount between said at least one outstanding invoice and an allowed payment amount determined by said buyer-specific business rule
   and processes said payment when the difference between said payment and said invoice is less than both said first difference amount and said second difference amount.

16. The system of claim 15 wherein said buyer-specific business rule is a buyer specific discount to an invoice.

17. The system of claim 15 wherein said buyer-specific business rule is a buyer specific decision to allow said buyer to pay less than the total amount of said invoice.

18. The system of claim 15 wherein said business data filter receives an adjustment to an invoice and applies said adjustment to said invoice prior to comparing said at least one invoice to said payment.

19. The system of claim 15 wherein said business data filter transmits said payment to a sales adjustment document creator when said payment does not match said at least one outstanding invoice within the criteria of said business rule.

20. The system of claim 19 wherein said business data filter transmits posting data to said seller to notify said seller that said payment does not match said at least one outstanding invoice.

21. The system of claim 15 wherein said processing is performed by an Application Service Provider (ASP).

22. The system of claim 15 wherein said processing is performed by a software application at a financial institution.

23. The system of claim 22 wherein said software application is web-based.

24. The system of claim 15 wherein said processing is performed by a software application that has been outsourced to a party other than said buyer and said seller.

25. The system of claim 24 wherein said software application is web-based.

26. A system for automated processing of adjustments to payments submitted by a buyer to a seller, said system including:
   a data source at a seller, said data source including a computer system having a set of buyer-specific business rules configured for use in processing an adjustment to a payment by a buyer;
   a business data filter computer system receiving an outstanding invoice for said buyer from a seller computer system and receiving a payment from a buyer computer payment system, said payment requiring an adjustment,
   wherein said business data filter computer system receives said set of buyer-specific business rules from said data source and processes said payment by matching said payment to an outstanding invoice using said set of buyer-specific business rules, wherein said set of business rules includes a buyer-specific numeric threshold difference in the amount of said payment and said invoice that is established by said seller for said buyer, wherein said numeric threshold is automatically adjusted by said business data filter computer system based on at least one of the size of the most recent invoice and the size of the most recent payment.

27. The system of claim 26 wherein said set of business rules includes a buyer specific discount to an invoice.

28. The system of claim 26 wherein said set of business rules includes a buyer specific decision to allow said buyer to pay less than the total amount of said invoice.

29. The system of claim 26 wherein said business data filter receives an adjustment to an invoice and applies said adjustment to said invoice prior to processing said payment.

30. The system of claim 26 wherein said business data filter transmits said payment to a sales adjustment document creator when said payment does not match said at least one outstanding invoice within the criteria of said business rule.

31. The system of claim 30 wherein said business data filter transmits posting data to said seller to notify said seller that said payment does not match said at least one outstanding invoice.

32. The system of claim 26 wherein said processing is performed by an Application Service Provider (ASP).

33. The system of claim 26 wherein said processing is performed by a software application at a financial institution.

34. The system of claim 33 wherein said software application is web-based.

35. The system of claim 26 wherein said processing is performed by a software application that has been outsourced to a party other than said buyer and said seller.

36. The system of claim 35 wherein said software application is web-based.

37. A system for automated processing of adjustments to payments submitted by a buyer to a seller, said system including:

a data source at a seller, said data source including a computer system having a set of buyer-specific business rules configured for use in processing an adjustment to a payment by a buyer;

a business data filter computer system receiving an outstanding invoice for said buyer from a seller computer system and receiving a payment from a buyer computer payment system, said payment requiring an adjustment, wherein said business data filter computer system receives said set of buyer-specific business rules from said data source and processes said payment by matching said payment to an outstanding invoice using said set of buyer-specific business rules, wherein said set of business rules includes a buyer-specific numeric threshold difference in the amount of said payment and said invoice that is established by said seller for said buyer, wherein said numeric threshold is automatically adjusted by said business data filter computer system based on the length of the relationship between said buyer and said seller.

\* \* \* \* \*